United States Patent [19]

Jackel

[11] Patent Number: 5,737,103
[45] Date of Patent: Apr. 7, 1998

[54] REDUCING CROSSTALK IN OPTICAL CROSS-CONNECTS BY APPROPRIATE CONFIGURATION UNUSED SWITCH ELEMENTS

[75] Inventor: Janet Lehr Jackel, Holmdel, N.J.

[73] Assignee: Bell Communications Research, Inc., Morristown, N.J.

[21] Appl. No.: 587,909

[22] Filed: Jan. 16, 1996

[51] Int. Cl.$^6$ ................................................. H04B 10/18
[52] U.S. Cl. ........................ 359/117; 359/139; 359/161
[58] Field of Search ................................. 359/117, 128, 359/139, 161

[56] References Cited

U.S. PATENT DOCUMENTS

| 550,818 | 5/1895 | Netravali et al. | 359/139 |
| 5,124,978 | 6/1992 | Chaao | 370/422 |
| 5,550,818 | 8/1996 | Brackett et al. | 359/139 |

FOREIGN PATENT DOCUMENTS

| 8704886 | 8/1987 | WIPO | 359/117 |

OTHER PUBLICATIONS

H. Scott Hinton, "An Introduction to Photonic Switching Fabrics," Plenum Press, New York and London, pp. 104–107.

Krishnan Padmanabhan and Arun N. Netravali, "Dilated Networks for Photonic Switching," IEEE Transactions on Communications, vol. COM-35, No. 12, Dec. 1987, pp. 1357–1365.

G. Hugh Song and Matthew Goodman, "Asymmetrically–Dilated Cross–Connect Switches for Low–Crosstalk WDM Optical Networks," Paper ONS3.5 in Proceedings of IEEE Lasers and Electro–Optics Society 1995 Annual Meeting, Oct. 30–Nov. 2, 1995, San Francisco, CA.

Primary Examiner—Leslie Pascal
Attorney, Agent, or Firm—James W. Falk; Joseph Giordano; Loria B. Yeadon

[57] ABSTRACT

A method and apparatus providing reducing crosstalk in optical cross-connects by configuring unused switching elements into a common switch state. The optical cross-connect may be a $2^N \times 2^N$ cross-connect which includes a plurality of dilated 2×2 switches each having a number of switch elements. A group of the switch elements connected between one or more inputs and one or more outputs of the cross-connect are suitably configured to provide one or more desired optical signal paths through the cross-connect. Unused cross-connect switch elements which are not part of any desired optical signal path are configured such that any unused switch elements in a given dilated 2×2 switch are placed in a common cross or bar switch state. The resulting cross-connect outputs will include at most one second order crosstalk term, as compared to conventional switch configurations in which a cross-connect output may have up to N second order crosstalk terms.

6 Claims, 4 Drawing Sheets

REDUCING CROSSTALK IN OPTICAL CROSS-CONNECTS BY APPROPRIATE CONFIGURATION UNUSED SWITCH ELEMENTS

FIELD OF THE INVENTION

The present invention relates generally to optical switching devices, and more particularly to techniques for reducing crosstalk in $2^N \times 2^N$ optical cross-connects.

BACKGROUND OF THE INVENTION

Accumulation of optical signal crosstalk generated in optical cross-connects is often an important limitation on the size of an all-optical communications network. An example of a cross-connect switching architecture specifically designed to reduce signal crosstalk in an optical network is the router/selector (R/S) architecture described on pp. 104–107 of H. S. Hinton, "An Introduction to Photonic Switching Fabrics," Plenum Press, New York, 1993, which is incorporated by reference herein. A $2^N \times 2^N$ optical switch or cross-connect can be constructed in accordance with the R/S architecture from a number of 2×2 switch elements. The R/S architecture generally provides a strictly nonblocking dilated cross-connect having a unique signal path from each input to each output.

FIGS. 1A and 1B show a conventional 2×2 optical switch element 10 in two possible switching states. FIG. 1A shows the 2×2 switch element 10 in the bar state, in which optical signals $S_1$ and $S_2$ applied to upper and lower input leads 12 and 14, respectively, are routed to upper and lower output leads 16 and 18, respectively. FIG. 1B shows the 2×2 switch element 10 in the cross state, in which $S_1$ is routed to lower output lead 18 and $S_2$ to upper output lead 16. In both the cross and bar states, the outputs of switch element 10 are susceptible to signal crosstalk as shown by the dashed lines. A given switch output will thus generally include a desired output signal $S_i$ as well as an undesired first order crosstalk component $\epsilon S_j$ resulting from, for example, imperfect routing of $S_j$ within switch element 10. Many available switch elements have an undesirably large crosstalk factor $\epsilon$.

Switch dilation is a well-known technique which has been utilized to reduce the output crosstalk in a 2×2 switch element such as element 10 from first order $\epsilon$ to second order $\epsilon_2$. FIGS. 2A and 2B show the bar and cross states, respectively, of a dilated 2×2 (D2×2) switch 20. The D2×2 switch 20 also represents a simplified R/S cross-connect configured in accordance with the above-noted R/S architecture. In the bar state of FIG. 2A, signals $S_1$ and $S_2$ on input leads 22 and 24, respectively, are routed through switch 20 to output leads 26 and 28, respectively. In the cross state of FIG. 2B, signals $S_1$ and $S_2$ are routed through switch 20 to output leads 28 and 26, respectively. The outputs of switch 20 are susceptible to crosstalk of order $\epsilon^2$ as shown in FIGS. 2A and 2B. A given output generally includes a desired output signal $S_i$ as well as an undesired crosstalk component $\epsilon^2 S_j$. The interconnection of several D2×2 switches along with other switching elements in a $2^N \times 2^N$ R/S cross-connect may produce additional crosstalk terms as will be described below. Further details regarding dilated optical switching may be found in, for example, K. Padmanabhan and A. Netravali, "Dilated Networks for Photonic Switching," IEEE Transactions on Communications, Vol. COM-35, No. 12, December 1987, which is incorporated by reference herein.

Various switching algorithms have been suggested for optimally configuring a $2^N \times 2^N$ R/S cross-connect made up of a plurality of D2×2 switches in order to reduce the resulting crosstalk. One such algorithm is described in G. H. Song and M. Goodman, "Asymmetrically-Dilated Cross-Connect Switches for Low-Crosstalk WDM Optical Networks," Paper ONS3.5 in Proceedings of IEEE Lasers and Electro-Optics Society 1995 Annual Meeting, Oct. 30–Nov. 2, 1995, San Francisco Calif., which is incorporated by reference herein. FIGS. 3A and 3B illustrate the operation of this prior art switching algorithm using an exemplary 4×4 R/S cross-connect 30. The R/S cross-connect 30 includes four 2×2 input switch elements 32-i, four central D2×2 switches or 2×2 R/S cross-connects 34-i and four output 2×2 switch elements 36-i. The 4×4 R/S cross-connect 30 may be configured in twenty-four different switch states. The individual switch elements of 4×4 cross-connect 30 through which signals pass in a given cross-connect configuration are shown as being in either a bar or cross state in FIGS. 3A and 3B, while all switch elements not used for signal switching are shown as empty blocks. All of the input switch elements 32-i and output switch elements 36-i are used for each of the twenty-four possible configurations of cross-connect 30. In the cross-connect state shown in FIG. 3A, two of the central D2×2 switch elements 34-2 and 34-3 are unused, and in the state shown in FIG. 3B, half of the 2×2 switches in each of the D2×2 switches 34-i are unused. The optical signal paths through cross-connect 30 are shown as heavy lines. It can be seen from the cross-connect states of both FIGS. 3A and 3B that only half of the switch elements in the central D2×2 switches have signals passing through them. The switch states of the remaining unused switch elements have no effect on the path that the signals take through the cross-connect 30.

The above-cited Song-Goodman reference suggests to require that each of the unused switch elements in the central D2×2 switches 34-i of FIGS. 3A and 3B be set to a state consistent with D2×2 switch operation. This means that any unused switch elements in the D2×2 switches will be placed in the appropriate bar or cross state such that the D2×2 switch as a whole is configured as shown in either FIG. 2A or FIG. 2B. Although this approach has the advantage of simplicity it generally does not result in a minimum amount of crosstalk at the cross-connect output. For example, first order crosstalk entering a given D2×2 switch 34-i of FIG. 3B in which the unused switch elements are configured in accordance with FIG. 2A or 2B may be passed directly through the D2×2 to the cross-connect output switch element 36-i. Although the output switch element 36-i will then reduce the input first order crosstalk to second order crosstalk, the first order crosstalk is coupled onto the desired signal path within the D2×2 switch thereby producing additional second order crosstalk terms at the output of switch element 36-i. A $2^N \times 2^N$ R/S cross-connect which configures unused switching elements in accordance with the Song-Goodman reference may therefore include as many as N second order crosstalk components at a given cross-connect output.

As is apparent from the above, a need exists for improved optical cross-connect configuration techniques which reduce the amount of signal crosstalk at a given output and thereby permit configuration of larger all-optical communication networks.

SUMMARY OF THE INVENTION

The present invention configures unused switching elements in an optical cross-connect or other optical switching device such that the amount of crosstalk at the device output is substantially reduced. A $2^N \times 2^N$ nonblocking router/ selector (R/S) cross-connect with unused switch elements configured in accordance with the invention will exhibit only a single second order crosstalk term at any given cross-connect output, as compared to prior art switch configurations which can produce as many as N second order crosstalk terms at a given output. The reduced crosstalk produced in accordance with the present invention is independent of the size of the cross-connect and thus eliminates a significant limitation previously imposed on the size of all-optical communication networks.

In accordance with one aspect of the invention, a method of configuring switch elements in an optical cross-connect is provided. The cross-connect includes a plurality of dilated 2×2 (D2×2) switches each having a number of switching elements. The method involves the steps of configuring a group of the switch elements in order to provide one or more desired optical signal paths through the cross-connect, and configuring unused switch elements which are not part of a desired signal path such that all unused elements in a given D2×2 switch are in a common switch state. The common switch state may be a cross state or a bar state.

In accordance with another aspect of the invention, an optical cross-connect is provided which includes a set of input switch elements, a set of central switches and a set of output switch elements. The cross-connect may be a $2^N \times 2^N$ strictly nonblocking router/selector (R/S) cross-connect in which a unique signal path can be configured from any given cross-connect input to any given cross-connect output. The central switches of the cross-connect include a plurality of D2×2 switches. The D2×2 switches are configured so as to provide one or more desired optical signal paths through the cross-connect. Any unused switching elements in a given D2×2 switch are configured to a common switch state which may be either a cross state or a bar state. This configuration of unused D2×2 switch elements provides reduced output crosstalk in $2^N \times 2^N$ cross-connects, and is particularly useful for those cross-connects in which N is large.

These and other advantages and features of the present invention will become more apparent from the accompanying drawings and the following detailed description.

DETAILED DESCRIPTION OF THE PREFERRED EMBODIMENTS

The present invention will be illustrated below in conjunction with an exemplary $2^N \times 2^N$ router/selector (R/S) nonblocking optical cross-connect suitable for use in an optical communication network. It should be understood, however, that the present invention is not limited to a particular type of optical switching device or application. The invention is instead more broadly applicable to any optical switching application in which optical crosstalk can be reduced by appropriate configuration of unused switching elements. The invention may be used with a variety of different types of optical switches, including but not limited to acousto-optic tunable filters (AOTFs), optical directional couplers, optical digital switches and switches based on Mach-Zender interferometers. The term "cross-connect" as used herein is intended to include these and other alternative optical switches arranged in a wide variety of different configurations. It should also be noted that although the invention is well-suited for use in wavelength division multiplexed (WDM) optical communication networks, it may also provide significant advantages in any of a number of other optical communication or optical signal processing applications.

Figure 1A:
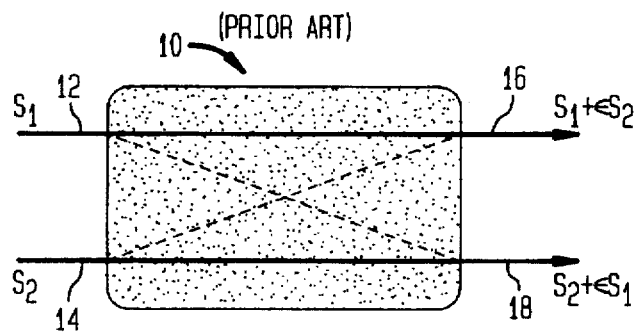
FIGS. 1A and 1B illustrate cross state and bar state positions, respectively, of a conventional 2×2 optical switch element.
Figure 1B:
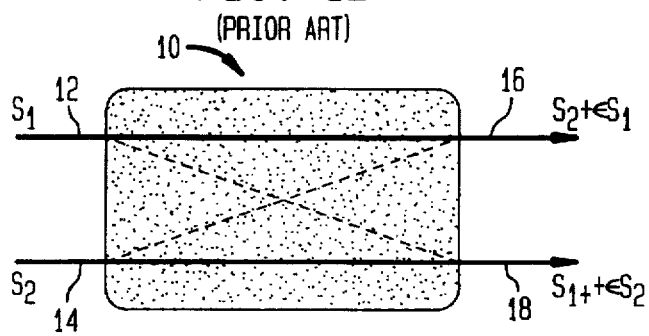
Figure 2A:
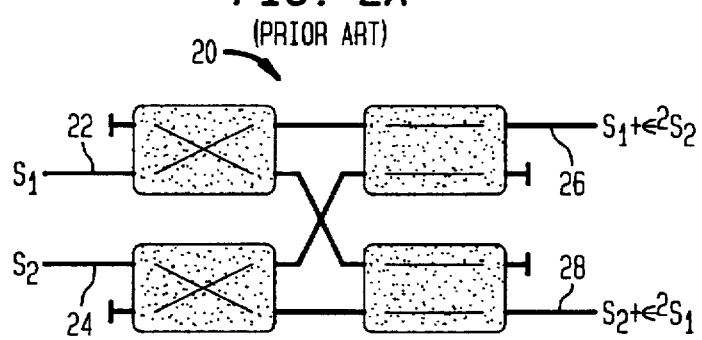
FIGS. 2A and 2B show two possible switch states for a dilated 2×2 (D2×2) switch in accordance with the prior art.
Figure 2B:
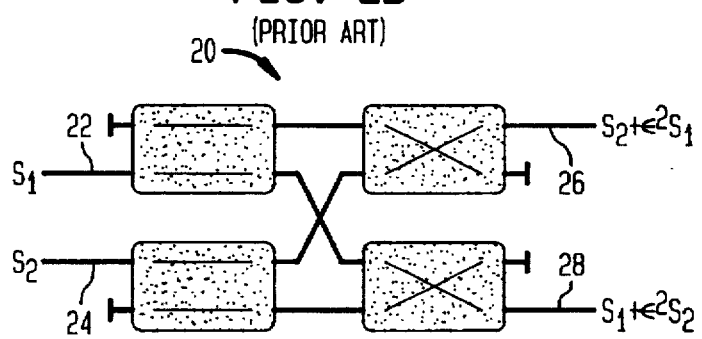
Figure 3A:
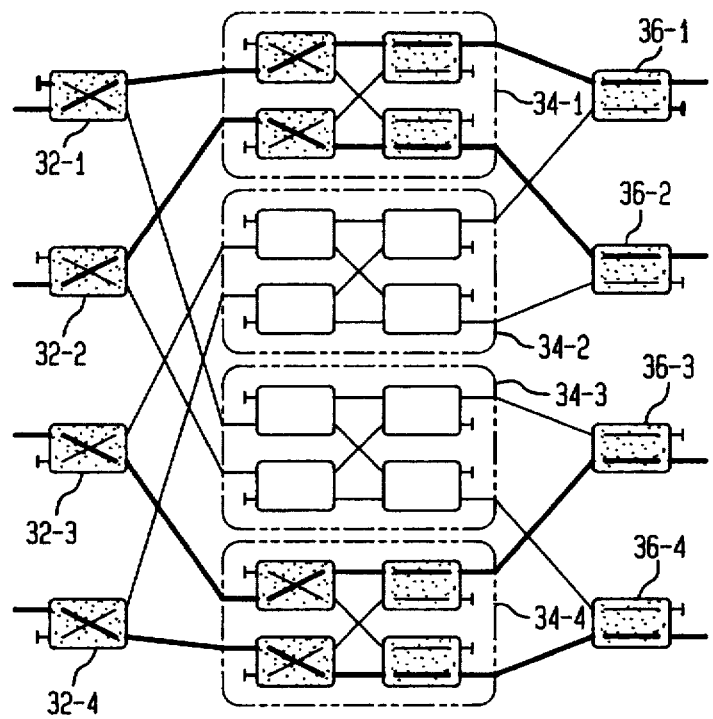
FIGS. 3A and 3B show an exemplary prior art 4×4 router/selector (R/S) cross-connect in two of twenty-four possible switch states.
Figure 3B:
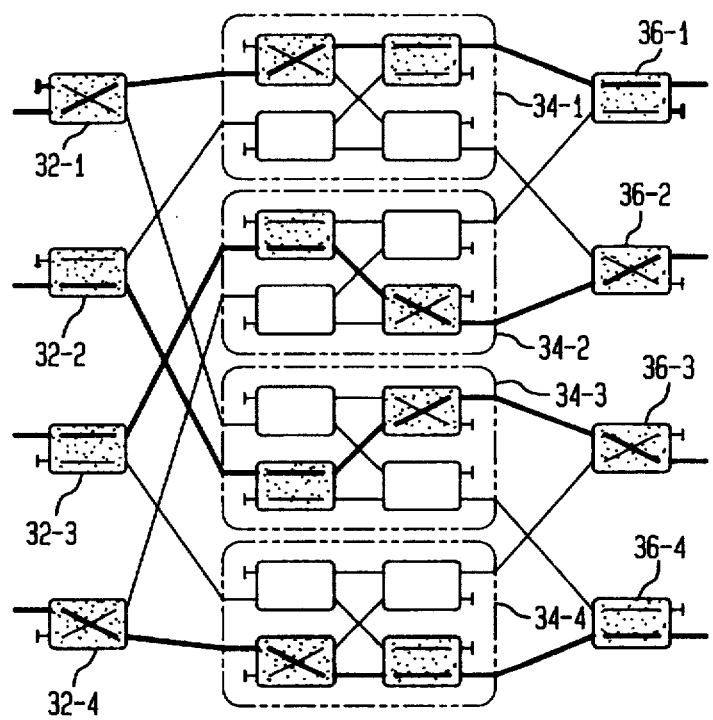
Figure 4A:
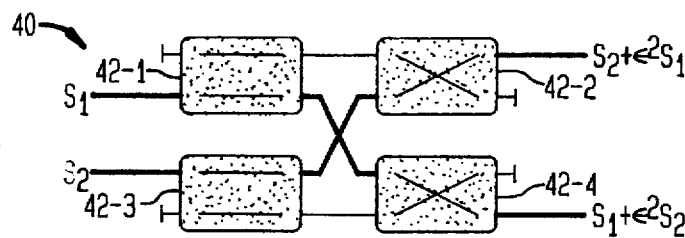
FIGS. 4A-4C show three possible configurations of a D2×2 switch in an R/S optical cross-connect in accordance with the prior art.
Figure 4B:
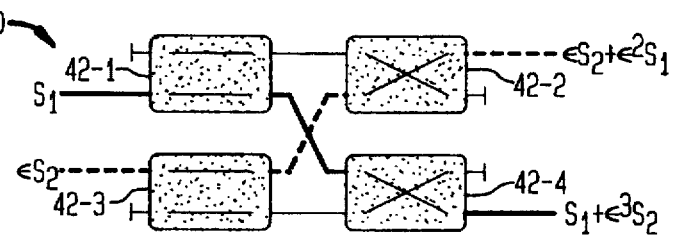
Figure 4C:
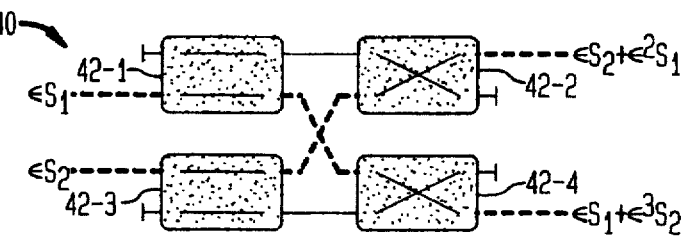

FIGS. 4A-4C show three possible configurations for a dilated 2×2 (D2×2) switch 40 in which any unused switch elements are configured in accordance with a prior art switching technique. The switch 40 in this example represents one of the central D2×2 switches in a conventional nonblocking R/S cross-connect such as the 4×4 R/S cross-connect 30 described above in conjunction with FIGS. 3A and 3B. In FIG. 4A, each D2×2 input receives a different signal $S_i$. In FIG. 4B, one D2×2 input receives a signal $S_1$ and the other input receives a first order crosstalk term $\epsilon S_2$. In FIG. 4C, one D2×2 input receives a first order crosstalk term $\epsilon S_1$ and the other input receives a first order crosstalk term $\epsilon S_2$. Thick solid black lines represent the paths of input optical signals and thick dashed lines represent the paths of input first order crosstalk. In each of the configurations shown in FIGS. 4A-4C, the 2×2 switch elements making up the D2×2 switch 40 are constrained in accordance with the above-described prior art switching technique to be in states corresponding to those shown in FIGS. 2A or 2B. In the configuration of FIG. 4A, all switching elements 42-i are used to carry signals and there are thus no unused switching elements. The switch elements in FIG. 4A have been selected to provide a cross state for the D2×2 switch 40 in accordance with the permissible D2×2 cross state as illustrated in FIG. 2B. The unused switching elements 42-2 and 42-3 of the FIG. 4B configuration and 42-1, 42-2, 42-3 and 42-4 of the FIG. 4C configuration are therefore placed in the permissible states required to provide the D2×2 cross state. Similar restrictions on unused switching elements would apply if switch 40 was configured for the D2×2 bar state as shown in FIG. 2A.

When switch 40 is configured as shown in FIG. 4A, each of the switch outputs includes signal $S_i$ and a second order crosstalk term $\epsilon^2 S_j$. When the switch 40 is configured as shown in FIG. 4B, a first order crosstalk term $\epsilon S_2$ passes through switch elements 42-3 and 42-2 to the output of switch 40, while all other output crosstalk terms are of second or third order. When the switch 40 is configured as shown in FIG. 4C, a first order crosstalk term $\epsilon S_1$ passes through switch elements 42-1 and 42-4 to the switch output and the first order crosstalk term $\epsilon S_2$ passes through switch elements 42-3 and 42-2 to the switch output. The presence of first order crosstalk terms $\epsilon S_1$ and/or $\epsilon S_2$ at the output of switch 40 in FIGS. 4B and 4C is the result of configuring the unused switch elements in accordance with a prior art switching technique which constrains the central D2×2 switch in a $2^N \times 2^N$ R/S cross-connect to one of the two configurations shown in FIGS. 2A and 2B. A $2^N \times 2^N$ cross-connect may therefore have as many as N different second order crosstalk terms at its outputs. This may unduly constrain the size of the cross-connect and thereby the capacity of any optical communication network which includes the cross-connect. The present invention provides a switching technique which removes this constraint and results in only one second order crosstalk term at the cross-connect output regardless of the size of the cross-connect.

Figure 5A:
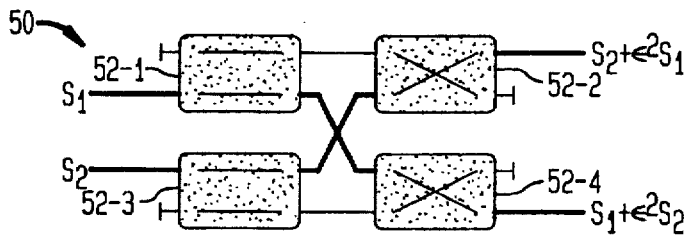
FIGS. 5A-5C show three possible configurations of a D2×2 switch in an R/S optical cross-connect with reduced crosstalk in accordance with the present invention.
Figure 5B:
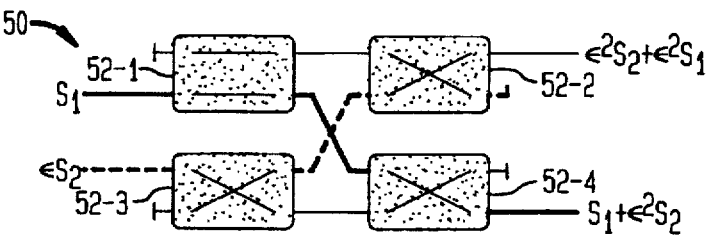
Figure 5C:
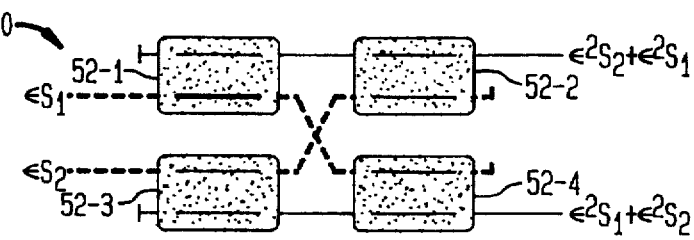

FIGS. 5A–5C show three possible configurations for a D2×2 switch 50 in which any unused switch elements are configured in accordance with a switching technique of the present invention. The switch 50 in this example represents one of the central D2×2 switches in a conventional cross-connect such as the 4×4 R/S cross-connect 30 described above in conjunction with FIGS. 3A and 3B. The signal and crosstalk inputs in FIGS. 5A–5C are the same as those described above in conjunction with FIGS. 4A–4C. Because there are no unused switch elements in the FIG. 5A configuration, the switch element states and resulting output crosstalk terms are the same as those shown in FIG. 4A.

The configuration of FIG. 5B is produced by setting unused switching element 52-3 to a cross state rather than a bar state as would be required by the prior art technique. It can be seen that the FIG. 5B configuration does not correspond to either of the two conventional D2×2 states shown in FIGS. 2A and 2B. The output of switch element 52-2 in FIG. 5B includes only second order crosstalk terms, all of which will then be reduced to third order when passing through the output switching element of a 4×4 R/S cross-connect such as element 36-i of FIG. 3A. It should be noted that when a given central D2×2 in a 4×4 cross-connect configured as shown in FIG. 3B has only a one signal input, all other central D2×2 switches in the cross-connect will also have only one signal input. The switch settings selected in accordance with the prior art technique and shown in FIG. 4B would therefore generally result in only a single second order crosstalk term at the cross-connect output.

The configuration of FIG. 5C is produced by setting unused switching elements 52-2 and 52-4 to a bar state rather than a cross state as would be required by the prior art technique. It can be seen that the FIG. 5C configuration does not correspond to either of the two conventional D2×2 states shown in FIGS. 2A and 2B. The output of switch elements 52-2 and 52-4 in FIG. 5C includes only second order crosstalk terms, all of which will then be reduced to third order when passing through the output switching element of a 4×4 R/S cross-connect such as element 36-i of FIG. 3A. The FIG. 5C configuration involves setting all of the unused switching elements 52-1, 52-2, 52-3 and 52-4 in the central D2×2 switch 50 to the same state. Although the bar state is used in this example, setting all unused switching elements in FIG. 5C to the cross state would produce the same output crosstalk result. The switching configuration of the present invention may therefore be described generally as placing all unused switch elements of a given D2×2 switch into a common state which may be either the cross state or the bar state.

Use of the switching configurations shown in FIGS. 5A–5C ensures that for all possible states of a 4×4 R/S cross-connect each cross-connect output will include one and only one second order crosstalk term. This provides a significant improvement over prior art switching configurations in which each cross-connect output may include as many as two second order crosstalk terms. The improvement is magnified as the size of the cross-connect increases, in that each output of a $2^N \times 2^N$ cross-connect will still include only one second order crosstalk term instead of up to N second order crosstalk terms which result using the prior art configurations.

Figure 6:
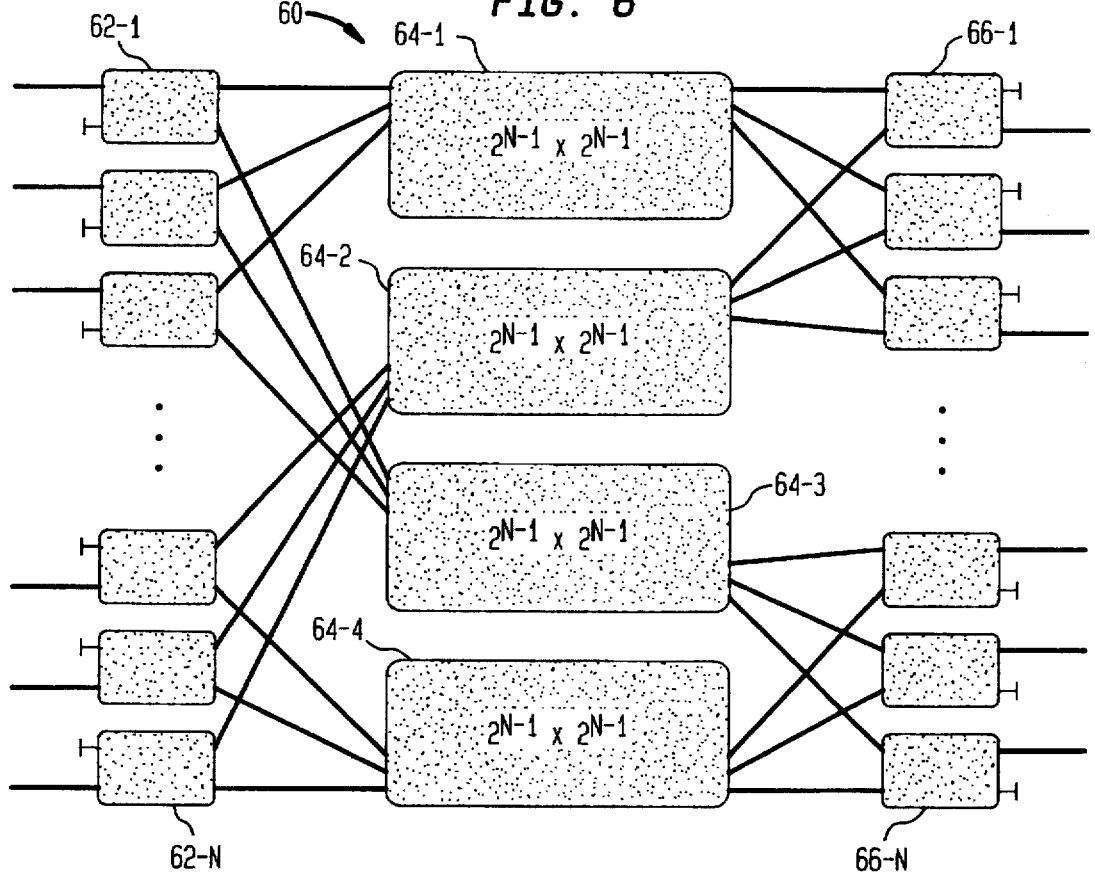
FIG. 6 is a block diagram of an exemplary $2^N \times 2^N$ R/S cross-connect with reduced crosstalk in accordance with the invention.

FIG. 6 is a block diagram of a general $2^N \times 2^N$ nonblocking R/S cross-connect 60 illustrating the extension of the above-described exemplary embodiment of the invention to larger cross-connects. The cross-connect 60 includes N input switch elements 62-1 through 62-N, four $2^{N-1} \times 2^{N-1}$ central cross-connects 64-1 through 64-4 and N output switch elements 66-1 through 66-N. If the prior art switching technique described in conjunction with FIGS. 4A–4C above is used, an N=1 (D2×2) cross-connect has one second order crosstalk term at each output, an N=2 (4×4) cross-connect has as many as two second order crosstalk terms at each output and it can be shown by induction that for the $2^N \times 2^N$ cross-connect 60 there are up to N second order crosstalk contributions at each output. By configuring the unused switch elements of the $2^{N-1} \times 2^{N-1}$ cross-connects 64-i in the manner described in conjunction with FIGS. 5A–5C above, the $2^N \times 2^N$ cross-connect 60 will have only one second order crosstalk term at any given output regardless of the value of N. The present invention provides a 3 dB improvement in the worst-case performance of a 4×4 R/S interconnect such as that shown in FIGS. 3A and 3B. The improvement in worst-case performance is on the order of 6 dB for a 16×16 cross-connect. Greater improvements in worst-case performance result as the size of the interconnect increases.

Figure 7:
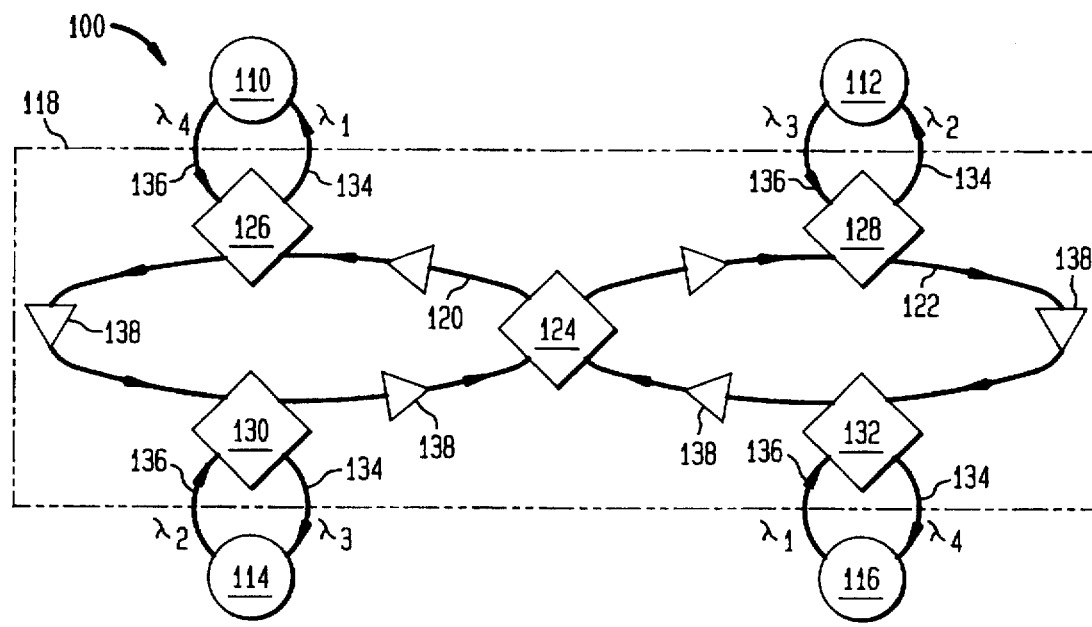
FIG. 7 shows an exemplary optical communication system incorporating optical cross-connects configured in accordance with the invention.

FIG. 7 shows an optical communication system 100 which incorporates one or more optical cross-connects in accordance with the present invention. The system 100 includes four access nodes 110, 112, 114 and 116 interconnected through an optical network 118. The network 118 includes in this simple example two ring networks 120 and 122 interconnected by a network cross-connect 124 and four add-drop cross-connects 126, 128, 130 and 132. A number of erbium-doped fiber amplifiers (EDFAs) 138 are inserted in the ring networks 120, 122 to maintain optical signal strength. The functionality of the network cross-connect 124 and add-drop cross-connects 126–132 are similar in this example. The cross-connects 124–132 are typically reconfigurable such that signals from any given access node can be switched to any other access node, and may be $2^N \times 2^N$ non-blocking R/S cross-connects with unused switch elements configured in the manner described in detail above. In one possible configuration of system 100, each access node 110–116 receives on an incoming line 134 an optical signal at a carrier wavelength $\lambda_i$ and transmits on an outgoing line 136 an optical signal at a carrier wavelength $\lambda_j$. The network cross-connect 124 and add-drop cross-connects 126–132 switch the optical signals in accordance with their optical carrier wavelength such that the appropriate signals are routed to and from the appropriate access node. It should be noted that the invention may be utilized in numerous alternative network configurations, and is in no way limited to specific applications such as WDM.

As noted above, the optical switch elements described herein may be implemented using acousto-optic tunable filters (AOTFs) or other suitable wavelength routing devices such as optical directional couplers, optical digital switches and switches based on Mach-Zender interferometers. Additional detail regarding AOTFs and other optical devices suitable for use with the present invention, as well as the use of optical cross-connects to add and/or drop signals in an optical network, are described in U.S. patent application Ser. No. 08/498,080 filed Jul. 3, 1995 and entitled "Asymmetrically Dilated Optical Cross Connect Switches," which is assigned to the present assignee and incorporated by reference herein.

The above-described embodiments of the invention are intended to be illustrative only. Numerous alternative embodiments may be devised by those skilled in the art without departing from the scope of the following claims.

What is claimed is:

1. A method of reducing crosstalk in an optical cross-connect circuit including a plurality of asymmetrically dilated 2×2 switches each having four switching elements connected between one or more inputs and one or more outputs, said method comprising the step of configuring unused cross-connect switch elements in each of said asymmetrically dilated 2×2 switches and which are not part of a desired optical signal path through the cross-connect circuit such that the unused switch elements in a given asymmetrically dilated 2×2 switch are configured in a common switch state.

2. The method in accordance with claim 1 wherein the step of configuring the unused cross-connect switch elements in each of said asymmetrically dilated 2×2 switches comprises configuring the unused switch elements in at least one of said asymmetrically dilated 2×2 switches in a cross state.

3. The method in accordance with claim 1 wherein the step of configuring the unused cross-connect switch elements in each of said asymmetrically dilated 2×2 switches comprises configuring the unused switch elements in at least one of said asymmetrically dilated 2×2 switches in a bar state.

4. An optical cross-connect circuit for routing one or more optical signals from one or more inputs to one or more outputs, said cross-connect circuit comprising a plurality of asymmetrically dilated 2×2 switches each having four switching elements connected between one or more inputs and one or more outputs, the unused switch elements in each of said asymmetrically dilated 2×2 switches which are not part of any desired optical signal path through the cross-connect circuit being in a common state for said each of said asymmetrically dilated 2×2 switches, whereby the crosstalk in said optical cross-connect circuit is limited to a single second order term.

5. The cross-connect circuit in accordance with claim 4 wherein the unused switch elements of at least one of said asymmetrically dilated 2×2 switches are in a cross state.

6. The cross-connect circuit in accordance with claim 4 wherein the unused switch elements of at least one of said asymmetrically dilated 2×2 switches are in a bar state.

* * * * *